(12) United States Patent
Aliakseyeu et al.

(10) Patent No.: US 12,495,480 B2
(45) Date of Patent: Dec. 9, 2025

(54) DISPLAYING A LIGHT CONTROL UI ON A DEVICE UPON DETECTING INTERACTION WITH A LIGHT CONTROL DEVICE

(71) Applicant: SIGNIFY HOLDING B.V., Eindhoven (NL)

(72) Inventors: Dzmitry Viktorovich Aliakseyeu, Eindhoven (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/789,656

(22) PCT Filed: Dec. 21, 2020

(86) PCT No.: PCT/EP2020/087466
§ 371 (c)(1),
(2) Date: Jun. 28, 2022

(87) PCT Pub. No.: WO2021/136711
PCT Pub. Date: Jul. 8, 2021

(65) Prior Publication Data
US 2023/0033157 A1    Feb. 2, 2023

(30) Foreign Application Priority Data

Jan. 2, 2020  (EP) .................................. 20150032

(51) Int. Cl.
*H05B 47/175*    (2020.01)
(52) U.S. Cl.
CPC ................. *H05B 47/175* (2020.01)

(58) Field of Classification Search
CPC ........ H05B 47/19; H05B 45/20; H05B 45/10; H05B 47/11; H05B 47/115; H05B 47/175; H05B 45/30; H05B 47/105; H05B 47/155; H05B 47/195; H05B 47/16; H05B 47/125; H05B 47/10; H05B 47/165; H05B 47/17; H05B 47/12; H05B 47/18; H05B 45/22; H05B 45/00; H05B 47/199; H05B 45/3725; H05B 44/00; H05B 45/24; H05B 45/12; H05B 47/13; H05B 47/185; H05B 45/37; H05B 47/20; H05B 45/3577; H05B 45/46; H05B 45/325; H05B 47/22; H05B 45/14;
(Continued)

(56) References Cited

U.S. PATENT DOCUMENTS 9,839,101 B2    12/2017  Clymer et al.
10,278,263 B2 *  4/2019  Van De Sluis ...... H05B 47/105
(Continued)

FOREIGN PATENT DOCUMENTS

EP    2823692 B1    5/2018

*Primary Examiner* — Monica C King (57) ABSTRACT

A system (1) for controlling a light source (11) in response to detecting interaction with a light control device (16) by a user (51) is configured to detect the interaction with the light control device by the user, transmit a first command or a signal to the light source in response to the detection, and transmit a second command to a further device (21) in response to the detection. The first command or the signal causes the light source to render a light effect. The second command causes the further device to display a user interface that allows the user to control the light source.

11 Claims, 4 Drawing Sheets

(58) Field of Classification Search
CPC ...... H05B 47/14; H05B 45/44; H05B 45/375;
H05B 45/395; H05B 45/40; H05B 45/39;
H05B 45/48; H05B 45/38; H05B 47/135;
H05B 45/3578; H05B 45/357; H05B
45/56; H05B 45/18; H05B 45/28; H05B
45/50; H05B 45/345; H05B 45/385;
H05B 45/52; H05B 47/29; H05B 45/382;
H05B 45/305; H05B 45/60; H05B 45/34;
H05B 45/59; H05B 45/36; H05B 45/54;
H05B 41/36; H05B 41/38; H05B
41/3921; H05B 45/355; H05B 45/397;
H05B 47/26; H05B 47/00; H05B 45/347;
H05B 45/31; H05B 45/35; H05B
45/3575; H05B 39/04; H05B 45/3574;
H05B 33/00; H05B 41/2827; H05B
45/335; H05B 45/58; H05B 47/196;
H05B 47/197; H05B 47/23; H05B 33/12;
H05B 39/044; H05B 45/315; H05B
45/32; H05B 45/33; H05B 47/1995;
H05B 47/235; H05B 47/24; H05B
39/088; G06F 3/04815; G06F 3/0482;
G06F 3/0484; G06F 3/04847; G06F
3/0486; G06F 3/0488; G06F 3/04883;
G06F 3/16; G06F 3/14; H01H 2219/039;
F21K 9/232; F21K 9/238; F21K 9/64;
F21K 9/61; F21K 9/278; F21K 9/68;
F21K 9/23; F21K 9/235; F21K 9/237;
F21K 9/62; F21K 9/65; F21K 9/272;
F21K 9/20; F21K 9/60; F21K 9/66; F21K
9/27; F21K 9/90; F21K 9/69; F21K 9/00;
F21K 9/275; F21K 9/233; F21K 99/00
See application file for complete search history.

(56) References Cited

U.S. PATENT DOCUMENTS

| | | | |
|---|---|---|---|
| 2014/0106735 A1* | 4/2014 | Jackson | H04W 8/245 |
| | | | 455/419 |
| 2014/0266600 A1* | 9/2014 | Alberth, Jr. | G06V 40/172 |
| | | | 340/5.83 |
| 2015/0002276 A1* | 1/2015 | Kicklighter | H05B 47/18 |
| | | | 340/12.5 |
| 2015/0351191 A1* | 12/2015 | Pope | H05B 45/37 |
| | | | 315/294 |
| 2016/0342297 A1 | 11/2016 | Ellwood | |
| 2017/0038787 A1* | 2/2017 | Baker | H05B 47/19 |
| 2019/0073116 A1 | 3/2019 | Severin | |
| 2019/0313509 A1* | 10/2019 | Slegers | H05B 47/115 |
| 2023/0247742 A1* | 8/2023 | Slivka | H05B 47/175 |
| | | | 315/291 |
| 2023/0393714 A1* | 12/2023 | Giuliani | G06F 3/04847 |
| 2023/0422378 A1* | 12/2023 | Slivka | H05B 45/20 |

* cited by examiner

DISPLAYING A LIGHT CONTROL UI ON A DEVICE UPON DETECTING INTERACTION WITH A LIGHT CONTROL DEVICE

CROSS-REFERENCE TO PRIOR APPLICATIONS

This application is the U.S. National Phase application under 35 U.S.C. § 371 of International Application No. PCT/EP2020/087466, filed on Dec. 21, 2020, which claims the benefit of European Patent Application No. 20150032.9, filed on Jan. 2, 2020. These applications are hereby incorporated by reference herein.

FIELD OF THE INVENTION

The invention relates to a system for controlling a light source in response to detecting interaction with a light control device by a user.

The invention further relates to a method of controlling a light source device in response to detecting interaction with a light control device by a user.

The invention also relates to a computer program product enabling a computer system to perform such a method.

BACKGROUND OF THE INVENTION

Philips Hue is a consumer connected lighting solution. The Hue system typically comprises a central controller, named a bridge (or hub), wirelessly controllable lighting devices and user interfaces in various forms (light control devices, sensors and mobile device apps). The bridge is connected to the router of the user and communicates to the lighting devices. It can run schedules and home automation rules. In this way, it acts as the intelligence of the system. All user interfaces connect to the bridge in order to actuate the lights.

In the Hue system, mobile device apps are typically used when the user is not close to a light control device. Mobile device apps may also be used to when it is not convenient to use a light control device, as disclosed in US 2016/0342297 A1. US 2016/0342297 A1 discloses that when the user places the smartphone near a control panel, the smartphone picks up functions from the control panel and temporarily impersonates the control panel in the eyes of the house automation system.

The Hue system includes a range of physical accessories that could be used to control lighting, including the Hue dimmer switch, the Hue tap switch and the Hue smart button. The Hue smart button and other hue accessories can only accommodate a limited number of physical controls and have limited means for displaying to the user what behaviors have been assigned to the physical controls.

US 2019/313509 A1 discloses a system wherein a user can record and create rules. The user opens the rule app and then presses a button of a light switch, and a user can select a lighting effect for that button via a user interface, such that when the user actuates the button, the controller will automatically enact the associated programmed lighting effect.

SUMMARY OF THE INVENTION

It is a first object of the invention to provide a system, which helps provide an advanced user interface without significantly increasing the cost of light control devices. It is a second object of the invention to provide a method, which helps provide an advanced user interface without significantly increasing the cost of light control devices. In a first aspect of the invention, a system for controlling a light source in response to detecting interaction with a light control device by a user comprises at least one input interface, at least one further interface, and at least one processor configured to use said at least one input interface to detect said interaction with said light control device by said user, use said at least one further interface to transmit a first command or a signal to said light source in response to said detection, said first command or said signal causing said light source to render a light effect, and use said at least one further interface to transmit a second command to a further device in response to said detection, said second command causing said further device to display a user interface, said user interface allowing said user to control said light source.

By causing the further device to display an appropriate light control UI when the user interacts with a light control device, the user is able use an advanced UI while the primary control can be kept simple. Therefore, the cost of (manufacturing) the light control devices does not need to be increased (significantly). The advanced UI may be used, for example, for fine-grained control and may also be useful in situations where recommended settings are used. The user can directly make changes if he does not appreciate the recommendation.

For instance, if a user clicks a smart button to switch the light source on, his or her smart watch may also be also activated and show a UI that is relevant to the "light on" function. The UI may provide lamp brightness control, which is not possible via the button, so that if user wants to adjust the brightness setting, he or she could do it immediately on the smart watch (e.g. without selecting the app manually and selecting the relevant room). The advanced UI is also useful when the user wants different behavior from the button in different locations. While, different behavior can be enabled using ZigBee based localization, for example, the button is still limited to a set of specific functions and these functions are not visible to the user and therefore need to be remembered.

The further device may be a mobile device or another device with a display or able to control an external display, e.g. a smart speaker with a display like the amazon Show, a wearable personal device such as Augmented Reality (AR) glasses, a TV, or a settop box. The light source may be a lighting device or a light element (e.g. an LED), for example.

Said at least one processor may be configured to determine said light effect based on said interaction and specify said light effect in said first command or said signal and said second command. Said interaction with said light control device may comprise interaction with a button or a rotary switch of said light control device or interaction with a voice assistant via said light control device, for example. In the latter case, the light control device may be, for example, a smart speaker like the Amazon Echo that allows the user to control light sources.

Said at least one processor may be configured to transmit said second command to said further device based on a location of said further device and/or said user relative to a location of said light control device and/or relative to a location of said light source. Said further device may be a mobile device and said at least one processor may be configured to select said mobile device from a plurality of mobile devices based on a location of said mobile device relative to locations of said plurality of mobile devices. Said system may further comprise said plurality of mobile devices. The second command may be transmitted to a stationary further device with a display or able to control an external display if the user is close the display, for example.

The further device nearest to the light control device and/or the light source is most likely the further device that is held by the person that wants to control the light source. If only one further device is detected and this further device is not detected near the light control device and/or the light source, transmission of the second command may be skipped or the second command may be transmitted to a pre-configured device.

Said system may further comprise a memory and said at least one processor may be configured to select said further device based on a further device identifier stored in said memory. By pre-configuring the further device to which the second command should be transmitted, a fallback option may be provided. Alternatively, it may become easier to implement the system.

Said system may comprise said light control device and said at least one processor may be configured to use said at least one further interface to transmit said first command and said second command upon detecting that said user has interacted with a physical control of said light control device. If the system comprises the light control device, it may be able to receive a detection signal directly from the physical control. The input interface may be an input of the processor, which may receive the detection signal directly from the physical control to detect that said user has interacted with the physical control.

Said at least one processor may be configured to use said at least one input interface to receive a control command from said light control device and use said at least one further interface to transmit said first command, or said signal, and said second command upon receiving said control command. If the system does not comprise the light control device, e.g. is a bridge or a lighting device, it normally needs to receive a control command from the light control device, as it is normally not able to receive a detection signal directly from the physical control. The system may be, for example, a (e.g. Hue) Bluetooth light bulb that can receive the control command via Zigbee from the light control device and transmit the second command to the further device via Bluetooth.

Said least one processor may be configured to extract information from said control command and determine, in dependence on said information, whether to transmit said second command or not. For example, an identifier of the light control device or information indicating whether the light control device wants the second command to be transmitted may be extracted from the received control command. In the former case, the user may be able to indicate for a light control device whether he wants the second command to be transmitted, i.e. whether he wants the user interface to be displayed on the further device automatically, or the system may learn this automatically. Information indicating whether the light control device wants the second command to be transmitted may be configured in the light control device by the manufacturer of the light control device, for example.

Said user interface may comprise control functionality of said light source, said control functionality not being available on said light control device. The user interface might just provide an easier manner of controlling functionality already available on the light control device, e.g. by allowing a user to use a virtual slider to control dimming instead of by holding a button, but preferably, the user interface provides control functionality not available on the light control device. Functionality with a high level of granularity is considered not be available on the light control device if the light control device only allows this functionality to be controlled with a low level of granularity. For example, if the light control device only allows brightness to be controlled in 10% steps, a user interface on the further device that allows continuous control is considered to provide control functionality not available on the light control device.

Said user interface may allow said user to modify said light effect and control said light source to render said modified light effect and/or wherein said user interface is configured to display information related to said light effect and/or said interaction. This allows the user to correct the interaction he has had with the light control device, e.g. by learning what consequence his interaction has had and/or what consequences other interactions would have had and/or by fine-tuning the light effect. This is especially beneficial if the light effect is based on recommended settings.

Said second command may cause said further device to launch a lighting control application on said further device, said light control application displaying said user interface. Although the user interface could be embedded in the further device, e.g. in the operating system, it is more practical to implement it in a lighting control application. This lighting control application is preferably launched upon receipt of the second command if it is not already running.

Said second command may describe one or more of: a type of physical control which was used, a function which was used, functions mapped to said light control device and capabilities of said light source. This enables the user interface to offer advanced functionality. Said second command may describe a function associated with a physical control that was used or a function associated with a command provided by the user via a voice assistant, for example. Said second command may alternatively or additionally comprise an identifier of the light control device and/or an identifier of the light source.

In a second aspect of the invention, a method of controlling a light source in response to detecting interaction with a light control device by a user comprises detecting said interaction with said light control device by said user, transmitting a first command or a signal to said light source in response to said detection, said first command or said signal causing said light source to render a light effect, and transmitting a second command to a further device in response to said detection, said second command causing said further device to display a user interface, said user interface allowing said user to control said light source. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a light source in response to detecting interaction with a light control device by a user.

The executable operations comprise detecting said interaction with said light control device by said user, transmitting a first command or a signal to said light source in response to said detection, said first command or said signal causing said light source to render a light effect, and transmitting a second command to a further device in response to said detection, said second command causing said further device to display a user interface, said user interface allowing said user to control said light source.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
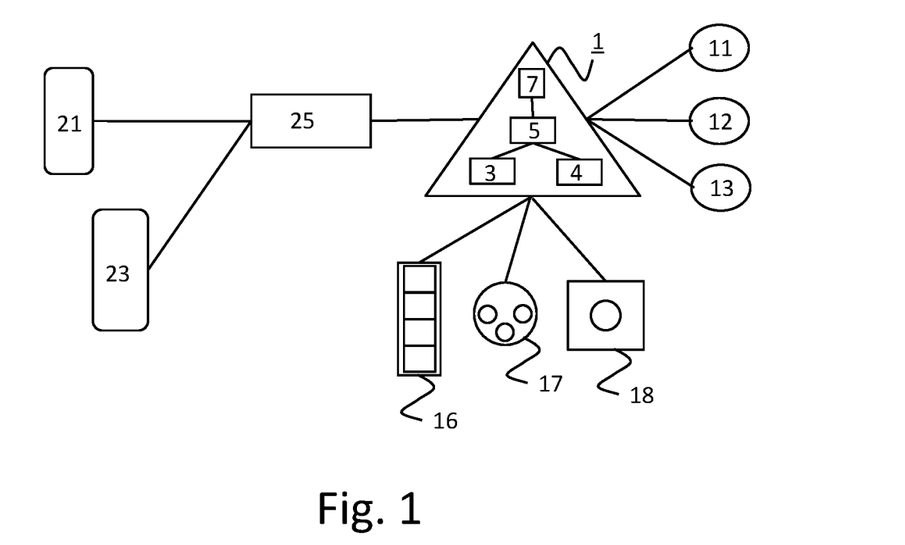
FIG. 1 is a block diagram of a first embodiment of the system.

FIG. 1 shows a first embodiment of the system for controlling a light source in response to detecting interaction with a light control device by a user: a bridge 1, e.g. a Philips Hue bridge. The bridge 1 communicates with lighting devices 11-13 and light control devices 16-18, e.g. using Zigbee technology. The lighting devices 11-13 may be Hue lamps, for example.

The light control device 16 may be a Hue dimmer switch, for example. The light control device 17 may be a Hue tap switch, for example. The light control device 17 may be a Hue smart button, for example. The bridge 1 is connected to the wireless LAN access point 25, e.g. via Ethernet or Wi-Fi. Mobile devices 21 and 23 are also connected to the wireless LAN access point 25, e.g. via Wi-Fi. Mobile devices 21 and 23 may each be a mobile phone, a tablet or a smart watch, for example.

The bridge 1 comprises a receiver 3, a transmitter 4, a processor 5, and a memory 7. The processor 5 is configured to use the receiver 3 to detect the interaction with one of the light control devices 16-18 by the user by receiving a control command from one of the light control devices 16-18, use transmitter 4 to transmit a first command to one or more of the lighting devices 11-13 in response to the detection and use transmitter 4 to transmit a second command to the mobile device 21 or 23 in response to the detection.

The first command causes the one or more lighting devices to render a light effect. The second command causes the mobile device 21 or 23 to display a user interface which allows the user to control the one or more lighting devices. The second command may alternatively cause another device than a mobile device to display this user interface, e.g. any device with a display or able to control an external display.

The interaction with the light control device 16, 17 or 18 may comprise interaction with a button or a rotary switch of the light control device 16, 17 or 18, for example. Alternatively, interaction with a smart speaker (not shown in FIG. 1) that allows the user to control lighting devices may be detected, e.g. interaction with an Amazon Echo. The second command may describe one or more of: a type of physical control which was used, a function which was used, functions mapped to the light control device and capabilities of the lighting device. The second command may describe a function associated with a physical control that was used or a function associated with a command provided by the user via a voice assistant, for example. The second command may alternatively or additionally comprise an identifier of the light control device and/or an identifier of the lighting device.

In the embodiment of the bridge 1 shown in FIG. 1, the bridge 1 comprises one processor 5. In an alternative embodiment, the bridge 1 comprises multiple processors. The processor 5 of the bridge 1 may be a general-purpose processor, e.g. ARM-based, or an application-specific processor. The processor 5 of the bridge 1 may run a Unix-based operating system for example. The memory 7 may comprise one or more memory units. The memory 7 may comprise one or more hard disks and/or solid-state memory, for example. The memory 7 may be used to store a table of connected lights, for example.

The receiver 3 and the transmitter 4 may use one or more wired and/or wireless communication technologies, e.g. Ethernet and/or Wi-Fi (IEEE 802.11), for communicating with the wireless LAN access point 25, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The bridge 1 may comprise other components typical for a network device such as a power connector. The invention may be implemented using a computer program running on one or more processors.

Figure 2:
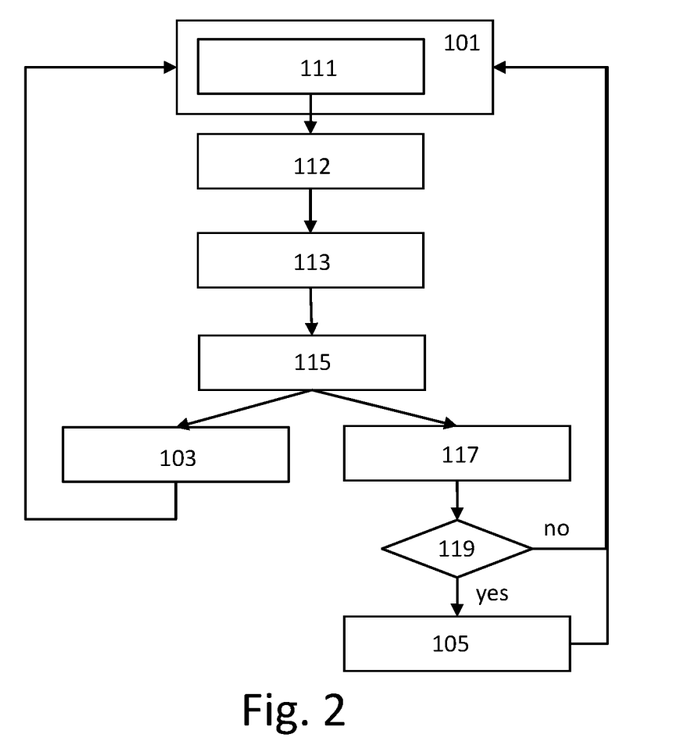
FIG. 2 is a flow diagram of a first embodiment of the method.

A first embodiment of the method of controlling a light source in response to detecting interaction with a light control device by a user is shown in FIG. 2. A step 101 comprises detecting the interaction with the light control device by the user. In the embodiment of FIG. 2, step 101 is implemented in a step 111. Step 111 comprises receiving a control command from the light control device.

If a native light control device is used, the system typically registers the event directly. For example, in the Hue system, the bridge would capture the Zigbee signal from the light control device and transmit a command to the lighting device(s) associated with the interaction. When a light control device is not a part of the core system, the system might request it to report its identity when changing the state of the system (e.g. activating the light). This may be beneficial, for example, when the light control device is a smart speaker with a voice assistant like Amazon Alexa. Voice commands are then interpreted by Alexa, which then transmits control commands to the bridge via the cloud. Non-native light control devices may communicate directly with the bridge using Zigbee or could communicate with the bridge via their own hub device and/or via the cloud.

Step 103, steps 112-119, and optionally step 105 of FIG. 2 are performed upon receiving this control command in step 111. Step 112 comprises determining, from the control command received in step 111, one or more lighting devices to be controlled. Associations between interactions and lighting devices may be retrieved from memory, for example.

Step 113 comprises determining locations of one or more further devices relative to the location of the light control device and/or the location(s) of the lighting device(s). In step 113, the system may detect if any smart device with a screen is available nearby and/or in use. Many smart devices have the ability to register whether the device is 'unused' (for example when it is charging or lying screen down on the table) or whether it is being carried and actively used. The proximity of devices could be measured using RF-based sensing (e.g. Bluetooth or Zigbee based) or it can be inferred based on the type of the device and number of people/ devices present. For example, if one person is present and only one smart watch is in the network, the system could assume that the smart watch is close to the light control device.

If only one further device has been detected in step 113, this further device is selected in step 115. If multiple further devices are detected nearby, the system needs to decide on which of the devices to display the UI. There can be different strategies on how to choose the further device. For example, the system may always choose the further device that is most likely to be very close to the user, e.g. a smart watch, or a device with the largest screen.

In some situations, the system would also need to differentiate between users if multiple detected devices belong to different users. In this case, the system could, for example, use the one that is detected to be closest to the lighting control device. In the embodiment of FIG. 2, if multiple further devices have been detected in step 113, the further device nearest to the light control device or nearest to the lighting device(s) is selected in step 115.

Figure 3:
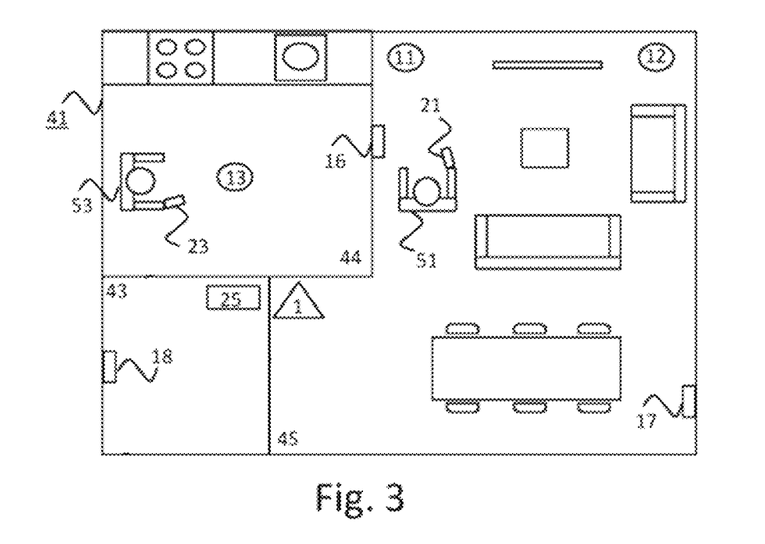
FIG. 3 illustrates an example in which the system of FIG. 1 is used in a home.

FIG. 3 illustrates how step 115 could, for example, be implemented. FIG. 3 shows an example of a floorplan of a home 41 in which the bridge 1 of FIG. 1 is used. Three rooms are depicted: a hall 43, a kitchen 44 and a living room 45. The light control device 18 and the wireless LAN access point 25 of FIG. 1 have been placed in the hall 43. The lighting device 13 of FIG. 1 has been installed in the kitchen 44. The bridge 1, the lighting devices 11 and 12 and the light control devices 16 and 17 of FIG. 1 have been placed in the living room 45.

The user 51 is holding mobile device 21 of FIG. 1 and interacting with light control device 16. If the lighting system, e.g. the bridge 1 and/or the light control device 16, has been configured such that the lighting device 11 is controlled based on this interaction and the mobile device nearest to the light control device 16 or nearest to the lighting device 11 is selected, then mobile device 21 is selected in step 115.

If the lighting system has been configured such that the lighting device 13 is controlled based on this interaction and the mobile device nearest to the light control device 16 is selected, then mobile device 21 is selected in step 115 as well. However, if the lighting system has been configured such that the lighting device 13 is controlled based on this interaction and the mobile device nearest to the lighting device 13 is selected, then mobile device 23 of FIG. 1, held by a user 53, is selected in step 115

Steps 103 and 117 are performed after step 115. Step 103 comprises transmitting a first command to the lighting device(s) determined in step 112. The first command causes the lighting device to render a light effect. This light effect may be determined in step 112 as well. The light effect may be specified in the received control command, for example. Alternatively, associations between interactions and light effects may be retrieved from memory in step 112, for example. Step 117 comprises extracting information from the control command received in step 111.

Step 119 comprises determining, in dependence on the information extracted in step 117, whether to transmit a second command or not. The second command causes the further device to display a user interface which allows the user to control the lighting device. The extracted information may indicate, for example, whether the light control device wants the second control command to be transmitted. Alternatively, the information may indicate an identifier of the light control device and a lookup may be performed in a memory to determine whether is beneficial to transmit the second control command for this light control device.

The user might be explicitly asked to select which of the light control devices should trigger transmission of the second command. The system might also learn this over time, e.g. by initially enabling the feature for every light control device and then over time, disabling it for the light control devices for which a user did not actively use the UI on the further device. Moreover, instead of disabling transmission of the second command, the system might specify the how long the UI should automatically be displayed to the user and make this short for devices for which the UI is rarely used.

If it is determined not to transmit the second command, then step 101 is repeated as soon as step 103 has been performed. If it is determined to transmit the second command, then step 105 is performed. Step 105 comprises transmitting the second command to the further device selected in step 115. This results in the further device displaying the afore-mentioned user interface.

The user interface as well as information displayed in the user interface may be dependent on the type of light control device or physical control used as well as what function was used. For example, if a button and single click was used to toggle light, the UI might display a brightness control and if double click was used to cycle between scenes, the UI might display all available scenes, so the user could immediately jump to the desired one. Moreover, how long the user interface is displayed may depend on the type of light control device used and/or how often the user uses it, for example. Next, step 101 is repeated as soon as step 103 has been performed.

Figure 4:
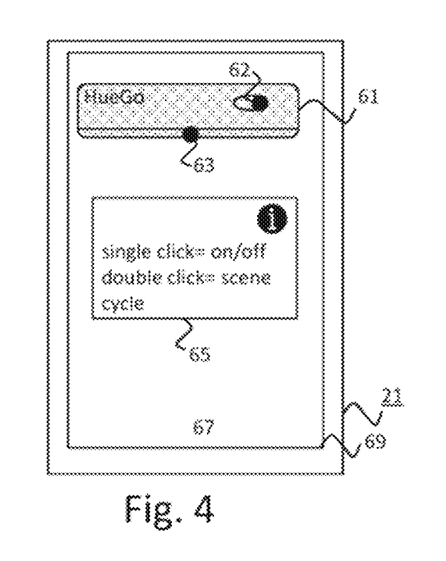
FIG. 4 shows an example of a user interface displayed by the mobile device.

FIG. 4 shows an example of a user interface 67 displayed by the mobile device 21 of FIG. 1 upon receiving the second command. In the example of FIG. 4, the user interface 67 is displayed on a display 69 by a light control application, which is launched by the mobile device 21 upon receiving the second command, if not already running. The application may bring the user interface to the front upon receiving the second command or it may provide a push notification whose selection results in the user interface being brought to the front.

The user interface 67 shows a control area 61 for the lighting device determined in step 112, named "HueGo" in this example. The control area 61 allows the user to modify the light effect rendered by the HueGo lighting device and control the HueGo lighting device to render the modified light effect. The control area 61 comprises control functionality available on the light control device: an on/off function operated with a virtual switch 62. The control area 61 further comprises control functionality not available on the light control device: a dim level adjuster operated with a virtual slider 63.

The user interface 67 displays information related to the light effect by filling the control area 61 with a color corresponding to the color setting of the light effect and positioning the virtual slider 63 at a position corresponding to the intensity of the light effect (shown at 50% in FIG. 4). The user interface 67 further displays information related to interaction in an information area 65. In the example of FIG. 4, the information area 65 indicates that the user can toggle the light source on and off by single clicking the button on the light control device and perform scene cycling by double clicking the button.

The application may, instead of bringing the user interface to the front upon receiving the second command (i.e. immediately after receiving the second command), bring the user interface to the front only if the user looks at the mobile device, e.g. after the user takes the mobile phone out of his pocket, moves the smart watch closer to his face. This may be detected using an accelerometer, a camera or other means.

Figure 5:
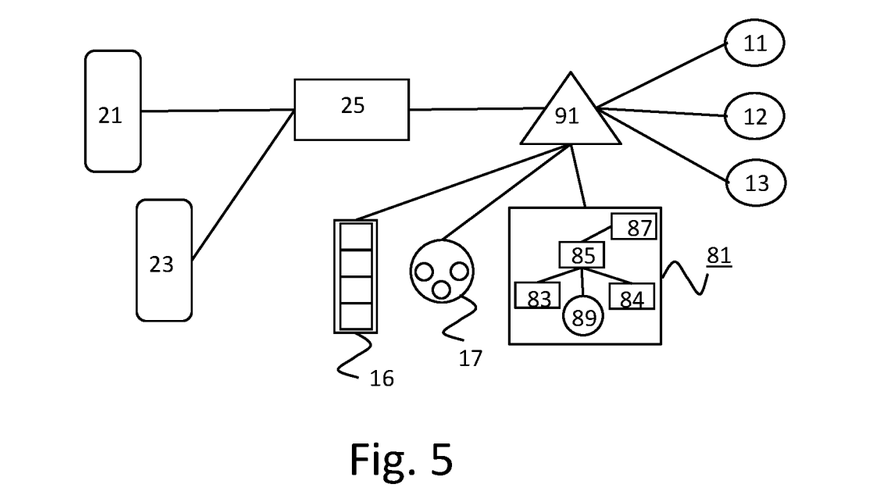
FIG. 5 is a block diagram of a second embodiment of the system.

FIG. 5 shows a second embodiment of the system for controlling a light source in response to detecting interaction with a light control device by a user: a light control device 81. In the example of FIG. 5, the lighting devices 11-13 and the light control devices 16, 17 and 81 communicate with a bridge 91 instead of bridge 1 of FIG. 1. The bridge 91 is connected to the wireless LAN access point 25, e.g. via Ethernet or Wi-Fi.

The light control device 81 comprises a receiver 83, a transmitter 84, a processor 85, a memory 87, and a button 89. The light control device 81 may be a Hue smart button, for example. In an alternative embodiment, the light control device 81 has more than one physical control. In an alternative embodiment, the light control device 81 has at least one different type of physical control instead of or in addition to the button 89, e.g. a rotary switch.

The processor 85 is configured to detect interaction with the button 89, use transmitter 84 to transmit a first command to one or more of the lighting devices 11-13 in response to the detection and use transmitter 84 to transmit a second command to the mobile device 21 or 23 in response to the detection. The first command causes the one or more lighting devices to render a light effect. The second command causes the mobile device 21 or 23 to display a user interface which allows the user to control the one or more lighting devices.

In the embodiment of the light control device 81 shown in FIG. 5, the light control device 81 comprises one processor 85. In an alternative embodiment, the light control device 81 comprises multiple processors. The processor 85 of the light control device 81 may be a general-purpose processor, e.g. ARM-based, or an application-specific processor. The memory 87 may comprise one or more memory units. The memory 87 may comprise solid-state memory, for example.

The receiver 83 and the transmitter 84 may use one or more wireless communication technologies, e.g. Zigbee, for communicating with the bridge 91, for example. In an alternative embodiment, multiple receivers and/or multiple transmitters are used instead of a single receiver and a single transmitter. In the embodiment shown in FIG. 5, a separate receiver and a separate transmitter are used. In an alternative embodiment, the receiver 83 and the transmitter 84 are combined into a transceiver. The light control device 81 may comprise other components typical for a connected light control device such as a power connector and/or a battery. The invention may be implemented using a computer program running on one or more processors.

In the embodiment of FIG. 5, the lighting devices 11-13 can be controlled by the light control devices 16, 17 and 81 and the mobile devices 21 and 23 via the bridge 91. In an alternative embodiment, one or more of the lighting devices 11-13 can be controlled by one or more of these devices without a bridge, e.g. directly via Bluetooth.

Figure 6:
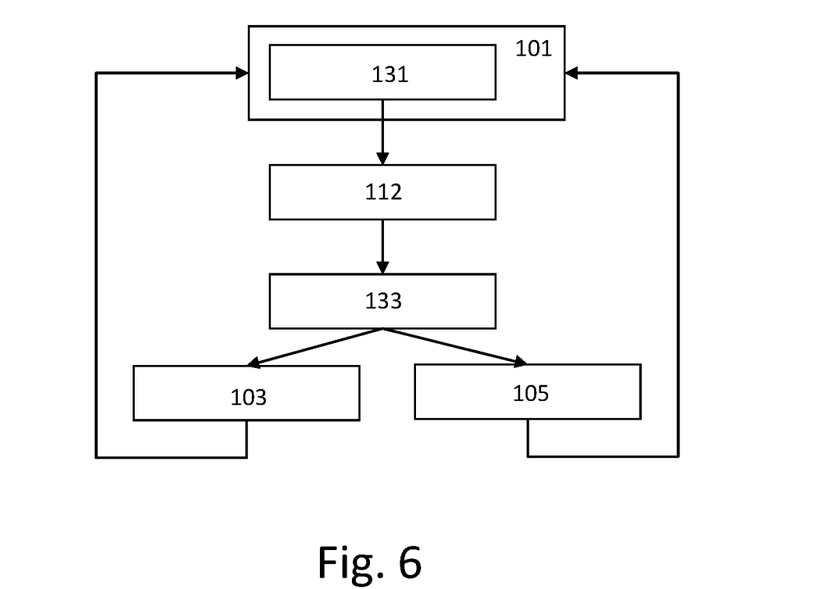
FIG. 6 is a flow diagram of a second embodiment of the method.

A second embodiment of the method of controlling a light source in response to detecting interaction with a light control device by a user is shown in FIG. 6. The method FIG. 6 may be performed by a light control device, for example. In the embodiment of FIG. 6, step 101 is implemented in a step 131. Step 131 comprises detecting that the user has interacted with a physical control of the light control device.

Steps 112, 133, 103 and 105 are performed upon detecting this interaction. Step 112 comprises determining, based on the interaction detected in step 111, one or more lighting devices to be controlled. Associations between interactions and lighting devices may be retrieved from memory, for example. Step 133 comprising selecting a further device, e.g. a mobile device, based on a further device identifier stored in memory. The further device identifier may be a Bluetooth device identifier or MAC address, for example. In an alternative embodiment, step 133 of FIG. 6 is replaced with steps 113 and 115 of FIG. 2.

Steps 103 and 105 are performed after step 133. Step 103 comprises transmitting a first command to the lighting device determined in step 112. The first command causes the lighting device to render a light effect. Step 105 comprises transmitting a second command to the further device selected in step 133. The second command causes the further device to display a user interface which allows the user to control the lighting device. Step 101 is repeated after steps 103 and 105 have been performed.

In the embodiments of FIGS. 1 and 5, the system comprises a single device. In an alternative embodiment, the system comprises a plurality of devices. In the embodiments of FIGS. 1 and 5, the system comprises a bridge and a light control device, respectively. In an alternative embodiment, the system comprises a different device, e.g. a lighting device.

For example, the system may comprise a Bluetooth or Wi-Fi lighting device that works without a bridge. In this case, the light control device may transmit the control command to the lighting device, either directly (e.g. using ZigBee) or indirectly via another hub (e.g. via a smart speaker using Bluetooth). The lighting device can then control its light source/element and inform the further device, e.g. a mobile device, via Bluetooth or Wi-Fi about the interaction to cause the further device to display a relevant graphical user interface. The lighting device may detect the proximity of the further device based on the Bluetooth RF signal, for example.

Figure 7:
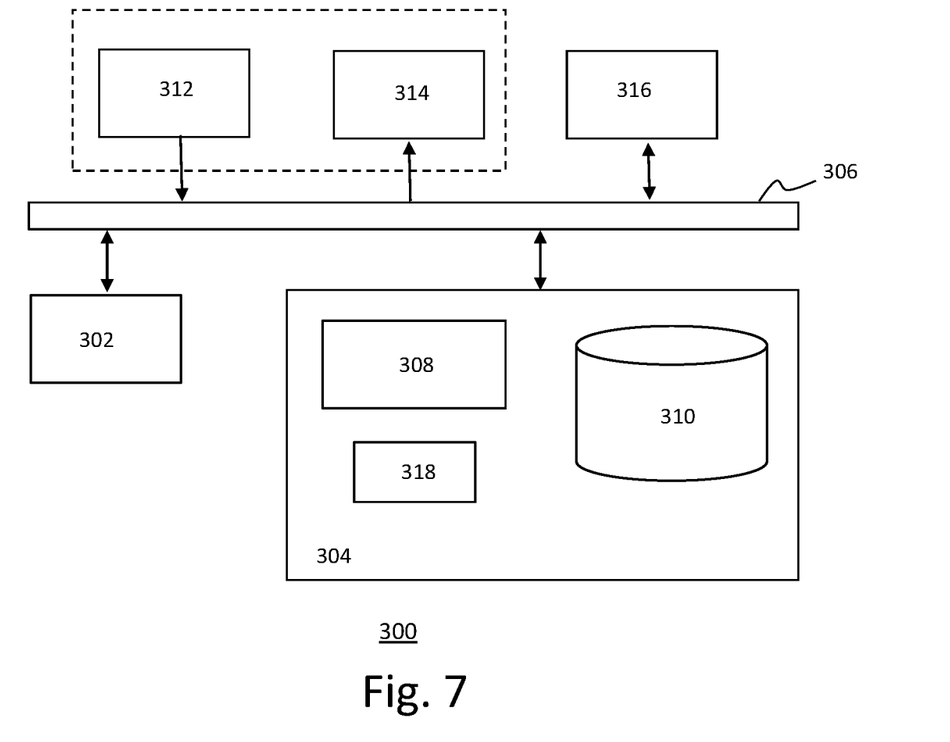
FIG. 7 is a block diagram of an exemplary data processing system for performing the method of the invention.

FIG. 7 depicts a block diagram illustrating an exemplary data processing system that may perform the method as described with reference to FIGS. 2 and 6.

As shown in FIG. 7, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 7 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display. A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 7, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 7) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a light source in response to detecting interaction with a light control device by a user, said system comprising:
    at least one input interface;
    at least one further interface;
    a memory; and
    at least one processor configured to:
        use said at least one input interface to detect said interaction with said light control device by said user,
        use said at least one further interface to transmit a first command or a signal to said light source in response to said detection, said first command or said signal causing said light source to render a light effect, and
        use said at least one further interface to transmit a second command to a further device in response to said detection, said second command causing said further device to display a user interface, said user interface allowing said user to control said light source,
    wherein said second command causes said further device to launch a lighting control application on said further device, said light control application displaying said user interface, and said at least one processor is further configured to select said further device based on a further device identifier stored in said memory, and
    wherein said at least one processor is configured to transmit said second command to said further device based on a location of said user relative to a location of said light control device and/or relative to a location of said light source.

2. A system as claimed in claim 1, wherein said further device comprises a mobile device and said at least one processor is configured to select said mobile device from a plurality of mobile devices based on a location of said mobile device relative to locations of said plurality of mobile devices.

3. A system as claimed in claim 2, further comprising said plurality of mobile devices.

4. A system as claimed in claim 1, wherein said system comprises said light control device and said at least one processor is configured to use said at least one further interface to transmit said first command and said second command upon detecting that said user has interacted with a physical control of said light control device.

5. A system as claimed in claim 1, wherein said at least one processor is configured to use said at least one input interface to receive a control command from said light control device and use said at least one further interface to transmit said first command, or said signal, and said second command upon receiving said control command.

6. A system as claimed in claim 5, wherein said at least one processor is configured to extract information from said control command and determine, in dependence on said information, whether to transmit said second command or not.

7. A system as claimed in claim 1, wherein said interaction with said light control device comprises interaction with a button or a rotary switch of said light control device or interaction with a voice assistant via said light control device.

8. A system as claimed in claim 1, wherein said user interface comprises control functionality of said light source, said control functionality not being available on said light control device.

9. A system as claimed in claim 1, wherein said user interface allows said user to modify said light effect and control said light source to render said modified light effect and/or wherein said user interface is configured to display information related to said light effect and/or said interaction.

10. A system as claimed in claim 1, wherein said second command describes at least one of: a type of physical control which was used, a function which was used, functions mapped to said light control device and capabilities of said light source.

11. A method of controlling a light source in response to detecting interaction with a light control device by a user, said method comprising:
- detecting said interaction with said light control device by said user;
- transmitting a first command or a signal to said light source in response to said detection, said first command or said signal causing said light source to render a light effect;
- selecting a further device based on a further device identifier stored in a memory; and
- transmitting a second command to a further device in response to said detection, said second command causing said further device to display a user interface, said second command being transmitted to said further device based on a location of s said user relative to a location of said light control device and/or relative to a location of said light source, said user interface allowing said user to control said light source, said second command causing said further device to launch a lighting control application on said further device, said light control application displaying said user interface.

* * * * *